US012603459B2

(12) United States Patent
Mastel et al.

(10) Patent No.: US 12,603,459 B2
(45) Date of Patent: Apr. 14, 2026

(54) CARRIER PLATE AND ARRANGEMENTS FORMED WITH SAME

(71) Applicant: WAGO Verwaltungsgesellschaft mbH, Minden (DE)

(72) Inventors: Rudolf Mastel, Minden (DE); Cord-Henrik Licht, Rinteln (DE); Torben Oberhommert, Porta Westfalica (DE)

(73) Assignee: Wago Verwaltungsgesellschaft mbH, Minden (DE)

( * ) Notice: Subject to any disclaimer, the term of this patent is extended or adjusted under 35 U.S.C. 154(b) by 282 days.

(21) Appl. No.: 18/369,525

(22) Filed: Sep. 18, 2023

(65) Prior Publication Data

US 2024/0097379 A1 Mar. 21, 2024

(30) Foreign Application Priority Data

Sep. 19, 2022 (DE) ..................... 20 2022 105 269.7

(51) Int. Cl.
*H01R 13/60* (2006.01)

(52) U.S. Cl.
CPC .................................... *H01R 13/60* (2013.01)

(58) Field of Classification Search
CPC .. H01R 13/60; H01R 9/2408; H01R 12/7023; H01R 13/514
See application file for complete search history.

(56) References Cited

U.S. PATENT DOCUMENTS

| | | | | | |
|---|---|---|---|---|---|
| 6,290,548 | B1 * | 9/2001 | Yeh | ...................... | H01R 13/514 439/607.02 |
| 9,711,882 | B2 * | 7/2017 | Brar | ................... | H01R 12/7023 |
| 11,509,081 | B2 | 11/2022 | Kliever | | |
| 2022/0045445 | A1 * | 2/2022 | Oosaka | .................. | H05K 3/303 |

FOREIGN PATENT DOCUMENTS

| | | | | | |
|---|---|---|---|---|---|
| DE | 203 18 084 | U1 | 5/2005 | | |
| DE | 202004001202 | U1 * | 6/2005 | ............. | H01R 43/24 |
| DE | 20 2017 104 144 | U1 | 3/2018 | | |
| DE | 10 2018 128 042 | A1 | 5/2019 | | |
| DE | 10 2018 111 733 | A1 | 11/2019 | | |
| JP | 2019029157 | A * | 2/2019 | ........... | H01H 50/048 |
| TW | 201136060 | A * | 10/2011 | ......... | H01R 13/6589 |

* cited by examiner

*Primary Examiner* — Travis S Chambers
(74) *Attorney, Agent, or Firm* — Muncy, Geissler, Olds & Lowe, P.C.

(57) ABSTRACT

A carrier plate in the form of a flat plate having a first main surface and a second main surface facing away from the first main surface, these main surfaces being the surface sides of the plate having the largest surface area, and having first detent elements to which an electrical plug connector, having second detent elements, with its second detent elements is affixable via form-fit interlocking of the first detent elements with the second detent elements. Further relates an arrangement is provided having such a carrier plate and at least two electrical plug connectors, each of which has second detent elements. Also, an arrangement is provided having two such carrier plates and a plug connector as well as a mating plug connector, each of which has second detent elements.

17 Claims, 9 Drawing Sheets

CARRIER PLATE AND ARRANGEMENTS FORMED WITH SAME

This nonprovisional application claims priority under 35 U.S.C. § 119(a) to German Patent Application No. 20 2022 105 269.7, which was filed in Germany on Sep. 19, 2022, and which is herein incorporated by reference.

BACKGROUND OF THE INVENTION

Field of the Invention

The invention relates to a carrier plate in the form of a flat plate, comprising a first main surface and a second main surface facing away from the first main surface, these main surfaces being the surface sides of the plate having the largest surface area, and comprising first detent elements to which an electrical plug connector, having second detent elements, with its second detent elements is affixable via form-fit interlocking of the first detent elements with the second detent elements. The invention further relates to an arrangement comprising such a carrier plate and at least two electrical plug connectors, each of which has second detent elements. The invention further relates to an arrangement comprising two such carrier plates and a plug connector as well as a mating plug connector, each of which has second detent elements.

Description of the Background Art

A generic carrier plate is known from DE 20 2017 104 144 U1.

SUMMARY OF THE INVENTION

The object underlying the invention is to provide a carrier plate and arrangements formed with the same that are improved over the prior art.

This object is achieved, in an example, with a carrier plate, in that the carrier plate has first detent elements at the first main surface and the second main surface in each case, so that at least one electrical plug connector with its second detent elements is affixable to the first main surface, and at least one further electrical plug connector with its second detent elements is affixable to the second main surface via form-fit interlocking of the first detent elements with the second detent elements. In this way, a carrier plate that is easily manufacturable, and having expanded application options compared to the known carrier plate, may be provided. Electrical plug connectors may advantageously be latched onto both sides of the carrier plate, i.e., to the first main surface and the second main surface of the carrier plate, which is made possible by the first detent elements present on both sides as an assembly. In addition, the carrier plate according to the invention inherently allows additional formation of encoding of a plug connector arrangement.

A plug connector may be, for example, a plug part or socket part for establishing an electrical connection. The plug connector may be configured for connection to a mating plug connector. The plug connector or the mating plug connector may be a pin strip or a socket strip, for example. The plug connector or the mating plug connector may have male pin contacts or female pin contacts, for example.

The carrier plate may be provided in a particularly efficient and cost-effective manner by manufacturing it as a plastic part, for example in an injection molding process.

The first and second main surfaces, as mentioned, are the surface sides of the plate having the largest surface area; accordingly, this does not involve the narrow sides of the plate. The flat plate may be designed as a flat plate or as an at least partially arched plate. The first detent elements of the first main surface may be situated with a certain lateral offset relative to the first detent elements of the second main surface, for example by offsetting them relative to one another with regard to the insertion direction.

At the first main surface and/or the second main surface, one, multiple, or all detent element(s) can be designed as a detent element that protrudes with respect to the surface. This allows simple, ergonomic, and reliable latching of the plug connectors to the particular main surface. The protruding detent elements may be designed, for example, as detent hooks and/or detent elements of a tongue and groove connection, for example with a dovetail profile. Also, one, multiple, or all detent elements may also be designed as a detent element that does not protrude with respect to the surface, for example as a detent recess.

The carrier plate can have at least one cable fixing region to which electrical lines, connected to electrical plug connectors that are affixed to the carrier plate, are fixable. This has the advantage that the lines connected to the plug connectors, which are latched to the carrier plate, may be easily fixed to the carrier plate in the immediate vicinity of the plug connectors. In this way, the carrier plate provides an integrated strain relief device for the electrical lines. In the cable fixing region, the carrier plate may have multiple through openings, for example, through which cable fixing components, for example cable ties, may be guided. The cable fixing region may be formed in one piece with the flat plate at which the first detent elements are situated.

The first detent elements may, for example, be coordinated with the second detent elements of the plug connectors in such a way that the plug connectors may be fastened with their connector face to the carrier plate in only one orientation, i.e., in a direction with the connector facing toward a connector face side of the carrier plate. Accordingly, the plug connectors fastened to the carrier plate are automatically oriented with their cable outlet sides in the direction toward the cable fixing region of the carrier plate.

The first detent elements can be situated at the first and/or second main surface, outside the cable fixing region. This may mean that in the cable fixing region, the first and second main surfaces are designed without first detent elements. Accordingly, the cable fixing region is used solely for fixing the electrical lines. Electrical plug connectors cannot be latched on at that location.

Multiple electrical plug connectors can be in each case affixable next to one another at the first main surface and/or the second main surface via form-fit interlocking of the first detent elements with the second detent elements. The flexible application options of the carrier plate are expanded in this way. The electrical plug connectors may be latched onto the first and/or second main surface in different configurations, depending on the selection of the user. In addition, the options for additional encoding are thus likewise enhanced.

Electrical plug connectors can be selectively affixable to the first main surface and/or the second main surface at different positions relative to the carrier plate, in particular at different positions perpendicular to the insertion direction of the electrical plug connectors. The insertion direction of the electrical plug connectors is regarded as the direction in which a mating plug connector is pluggable onto the plug connector. In particular, the electrical plug connectors may be affixed to the carrier plate by means of the detent elements at various discrete positions, depending on the selection of the user. In this way, the encoding options for the plug connection are further enhanced by the choice of the appropriate position of the plug connector at the carrier plate.

The number and type of electrical plug connectors that are affixable to a particular main surface may be varied for the first main surface and/or the second main surface. Here as well, the flexible use options for the carrier plate and the options for the additional encoding are further enhanced by the mounting of the plug connectors.

The carrier plate can have an encoding device. As a result, for example a location or orientation of plug connectors on the carrier plate, a location or orientation of the carrier plate with respect to a further carrier plate having a plug connector or mating plug connector, or a location or orientation of plug connectors and mating plug connectors affixed to carrier plates, relative to one another may, for example, be optically clarified or constrained with a predefined geometric encoding form. The encoding device may, for example, point in the same spatial direction as the connector face of a plug connector affixed to the carrier plate, or may be provided at a circumferential side or border edge of the carrier plate closest to the connector face of the plug connector that is affixed to the carrier plate. The encoding device may be, for example, an optical marking, for example a color marking, or an encoding form, for example a material projection or a material recess, at the circumference of the carrier plate. The circumference of the carrier plate corresponds to the surface of the carrier plate between the main surfaces of the carrier plate. Two carrier plates with a plug connector and a mating plug connector that are provided for being plugged together may have mutually corresponding encoding forms; for example, one carrier plate may have a material projection and the other carrier plate may have a geometrically matching material recess. For example, for example in which plug connectors with an identical or similar connector face are situated at the first and the second main surface of the carrier plate, mismating may be avoided. With an encoding device, the double-row plug connector or mating plug connector formed with the carrier plate may be inserted only in a certain location and orientation.

The carrier plate can have a further encoding device that is situated at a different edge side of the carrier plate than the first-mentioned encoding device. For example, the further encoding device may be situated on a side of the carrier plate facing away from the encoding device. In this way, additional securing of the arrangement formed with a carrier plate may be provided during insertion at a printed circuit board, in particular to provide protection against mismating between the printed circuit board and plug connectors to be mounted thereon.

The encoding device and/or the further encoding device can be laterally offset relative to a center axis of the carrier plate; i.e., the particular encoding device is situated off-center.

The object mentioned at the outset is further achieved by an arrangement comprising a carrier plate of the above-described type and at least two electrical plug connectors that each have second detent elements, at least one electrical plug connector with its second detent elements being affixed to the first main surface, and a further electrical plug connector with its second detent elements being affixed to the second main surface via form-fit interlocking of the first detent elements with the second detent elements. The advantages described above may also be achieved in this way. In particular, the carrier plate may thus form an intermediate layer between the electrical plug connectors situated on main surfaces facing away from one another.

The connector faces of electrical plug connectors affixed to both main surfaces may be exposed, so that a mating plug connector assigned as a mating part may be plugged in at the particular connector face. The connector faces of the plug connectors, viewed in the insertion direction, may protrude beyond the front edge of the carrier plate.

According to an example, it is provided that with their connector faces, the electrical plug connectors affixed to the first and the second main surface can be oriented in the same direction. This allows simple plugging of the mating plug connectors assigned to the plug connectors.

The at least one electrical plug connector affixed to the first main surface can be offset relative to the at least one electrical plug connector affixed to the second main surface, and/or has a different number of plug contacts. Additional encoding of the plug connection with regard to the overall arrangement made up of the carrier plate and the electrical plug connectors may be provided in this way.

A different number of electrical plug connectors can be affixed to the first main surface than to the second main surface. Additional encoding of the plug connection may also be provided in this way.

An additional component, which is not an electrical plug connector and which has at least one second detent element, can be affixed to the first main surface and/or to the second main surface via form-fit interlocking of at least one of the first detent elements with the at least one second detent element of the additional component. The flexible application options for the carrier plate are further enhanced in this way. Such an additional component may be, for example, a locking device for locking a plug connector to a mating plug connector, and/or a fastening flange for fastening the arrangement to another component or to the mating plug connector. Such a fastening flange may, for example, have a through hole through which a fastening element such as a screw or a rivet may be at least partially guided. Such an additional component may also have electrical and/or electronic components, for example, such as memory and/or control elements by means of which electrical encoding with a mating plug connector may be provided. In addition, the additional components may be designed as sensors, for example temperature sensors, or may include same.

The cable fixing region of the carrier plate may protrude with respect to the plug connectors affixed thereto, so that electrical lines that are connected to electrical plug connectors affixed to the carrier plate are fixable to the cable fixing region. This allows permissible, simple mechanical fixing of the electrical lines to the carrier plate.

Attaching electrical plug connectors to both sides of the carrier plate allows implementation of an additional encoding option, in that the plug connectors may, for example, be offset relative to one another at the carrier plate. In this way, different connector faces of the overall arrangement may be formed in the sense of connector face encoding. In addition, plug connectors having different numbers of poles may be situated at the carrier plate to form connector face encoding. Since the type and number of plug connectors at each main surface of the carrier plate may be varied, depending on the selection of the user, even further encoding options are available.

The object stated at the outset is further achieved by an arrangement comprising a carrier plate according to one of the features described above and at least one plug connector affixed thereto, and comprising at least one further carrier plate according to one of the features described above and at least one mating plug connector affixed thereto which is configured for connection to the plug connector. The plug connector and/or the mating plug connector have/has second detent elements, and are/is affixable to the respective carrier plate via form-fit interlocking of the first detent elements with the second detent elements, at least one carrier plate having an encoding device by means of which an insertion location and/or an insertion orientation of the plug connector and of the mating plug connector relative to one another are/is specified. The arrangement may in particular also have more than one plug connector or mating plug connector that is affixed to the first main surface and/or to the second main surface of the carrier plate. For example, the mating plug connector may be a pin strip and the plug connector may be a socket strip, which are provided for connection to one another. The carrier plate of the plug connector may, for example, have an encoding projection that points in the same spatial direction as the connector face of the plug connectors and that is accommodatable by a corresponding encoding recess in the carrier plate of the mating plug connector. Such an arrangement in the converse sense is also conceivable, for example with a socket strip as the mating plug connector and a pin strip as the plug connector. Such an arrangement comprising plug connectors and mating plug connectors and at least one carrier plate that includes an encoding device may be advantageous in particular when plug connectors or mating plug connectors having connector faces that are identical or easily confused for one another are affixed to both main surfaces of the carrier plates.

By use of the carrier plate according to the invention, single-row plug connectors may be expanded to form a double-row plug connector system by mounting on both sides of the carrier plate. The individual plug connectors do not have to be redesigned for this purpose. This also results in a significant streamlining effect in manufacturing the individual components. By use of the carrier plate according to the invention as the basis, a wide variety of plug connector designs may be created, depending on the selection of the user, via the combination of existing components, i.e., plug connectors and possibly additional components.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

A view of the connector face of the electrical plug connectors is regarded as a front view.

Figure 1:
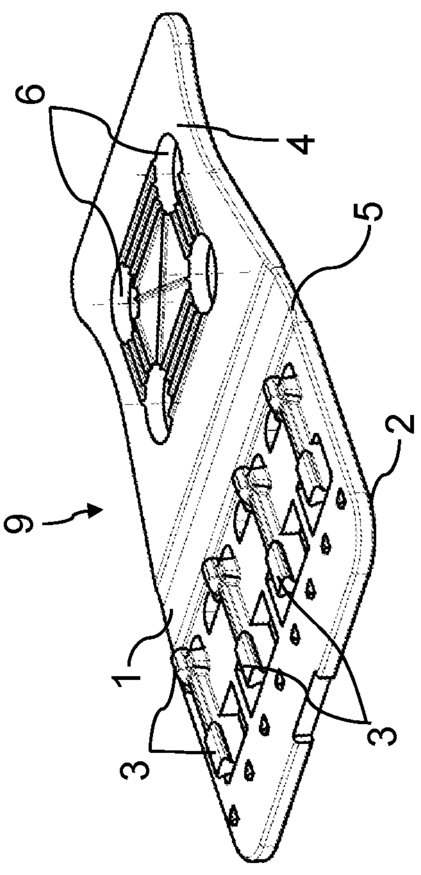
FIG. 1 shows a carrier plate according to an example, in a perspective view.
Figure 2:
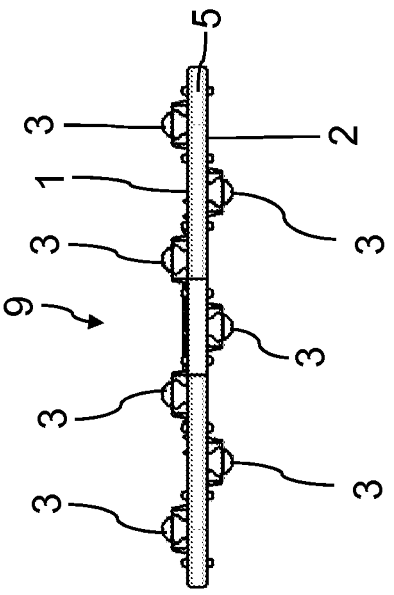
FIG. 2 shows the carrier plate according to FIG. 1 in a front view.

According to an example, the carrier plate 9 apparent in FIGS. 1 and 2 is designed in the form of a flat plate 5 having a first main surface 1 and a second main surface 2 facing away from the first main surface, i.e., two main surfaces 1, 2 that face away from one another. In a region of the carrier plate 9 that is used for fastening electrical plug connectors 10, the carrier plate 9 has first detent elements 3 at both main surfaces 1, 2, i.e., on both sides. An electrical plug connector 10 may be fastened in each case to one or more of the first detent elements 3 at the main surface 1, 2 by latching.

Outside this fastening region for the electrical plug connectors 10, i.e., in a region in which no first detent elements 3 are present, the carrier plate 9 has a cable fixing region 4 to which electrical lines 12, connected to electrical plug connectors 10 that are affixed to the carrier plate 9, may be fixed, and which accordingly experience strain relief. For this purpose, the cable fixing region 4 may have multiple through openings 6 through which cable fixing components 13, for example cable ties, may be guided.

It is apparent that the carrier plate 9 is designed as a relatively flat, planar plate 5 whose thickness is considerably less than the length and width. The thickness of the carrier plate 9 may, for example, be less than 1/10 of the largest dimension of length or width.

Figure 3:
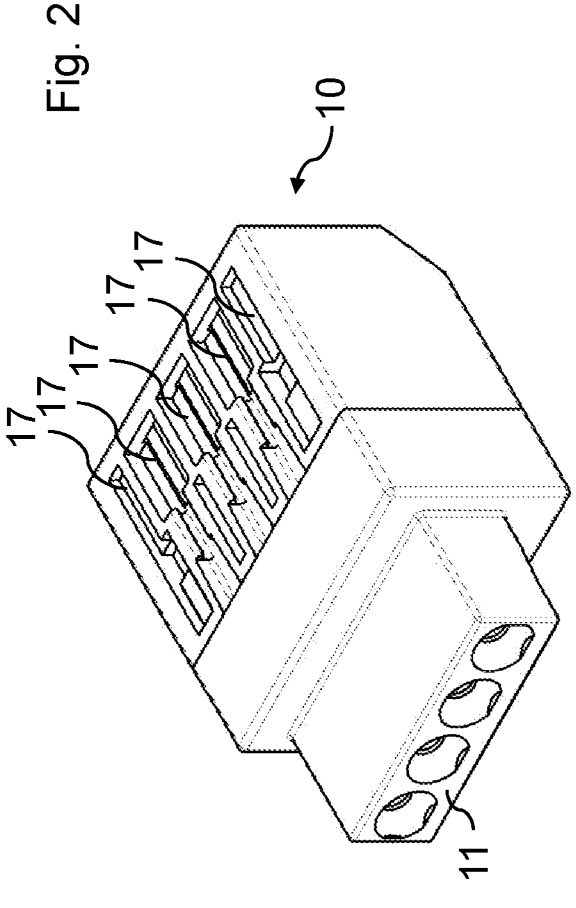
FIG. 3 shows an electrical plug connector in an isometric view.

FIG. 3 shows an example of a plug connector 10 designed as a socket strip, with a connector face 11 and second detent elements 17. In the example shown, the second detent elements 17 are designed as detent openings into which the first detent elements 3, which are designed as detent projections and shown in FIG. 1, for example, may engage in order to latch the plug connector 10 to the carrier plate 9. For this purpose, the second detent elements 17 are configured with respect to one another and positioned at the plug connector 10 in such a way that they are in correspondence with the first detent elements 3 of the carrier plate 9 with regard to position and orientation, and the first detent elements 3 are able to completely snap into the second detent elements 17.

Figure 4:
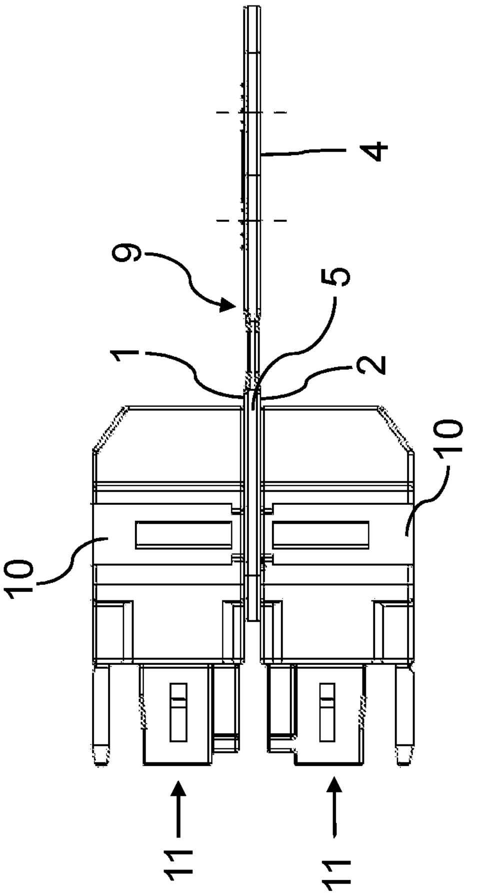
FIG. 4 shows an arrangement comprising a carrier plate and two electrical plug connectors, in a side view.

FIG. 4 shows an arrangement comprising a carrier plate 9 and two electrical plug connectors 10, each of which has second detent elements 17. Each electrical plug connector 10 with its second detent elements 17 is connected to the first detent elements 3 of one of the main surfaces 1, 2 by latching. The carrier plate 9 is thus fitted with electrical plug connectors 10 on both sides. The electrical plug connectors 10 are fastened to the carrier plate 9 in such a way that their connector faces 11, i.e., the sides at which the mating plug connector may be inserted, point in the same direction, in particular in a direction away from the cable fixing region 4.

Figure 5:
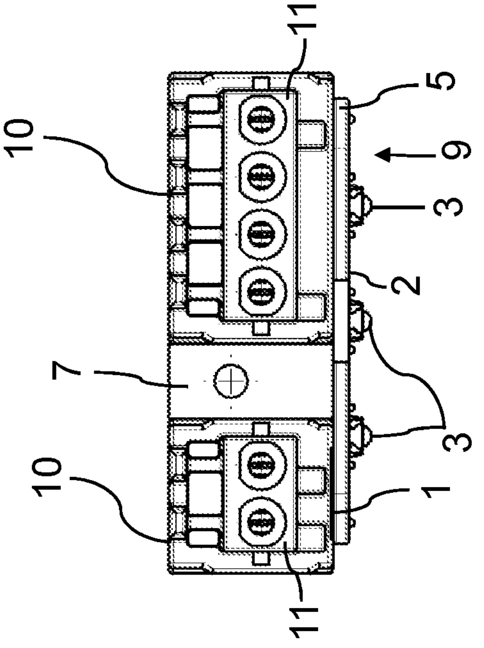
FIG. 5 shows an arrangement comprising a carrier plate and elements fastened thereto, in a front view.

FIG. 5 shows an arrangement comprising a carrier plate 9 and two electrical plug connectors 10 that are fastened to the first main surface 1, and an additional component 7, for example a fastening flange, that is additionally mounted on the first main surface 1 by means of latching via one of the first detent elements 3. In the illustrated example, the additional component 7 is situated between two plug connectors 10. Other arrangements are also conceivable. Of course, the carrier plate 9 may also be fitted with one or more plug connectors 10 and/or one or more additional components 7 at the second main surface 2.

It is also pointed out that when the carrier plate 9 is fitted with plug connectors 10 at a main surface 1, 2, these do not necessarily have to be identical plug connectors 10; a main surface 1, 2 may also be fitted with plug connectors 10 having different designs and/or numbers of poles.

Figure 6A:
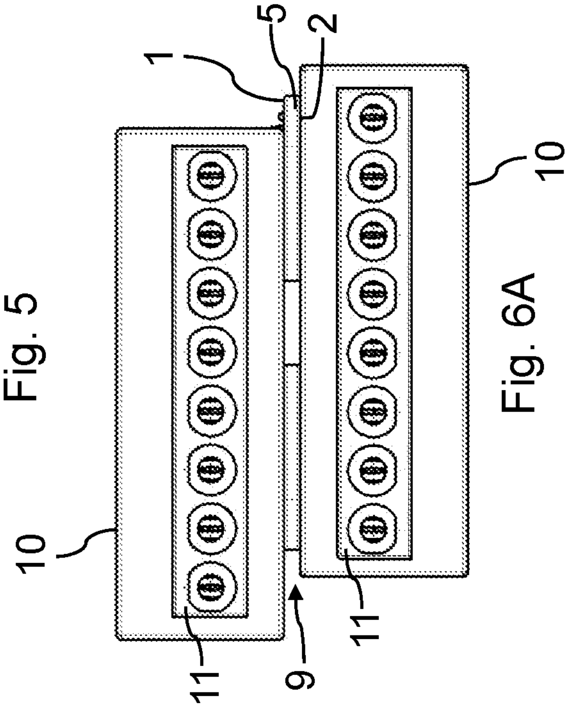
FIGS. 6A and 6B show various arrangements of carrier plates and identical plug connectors, in a front view.
Figure 6B:
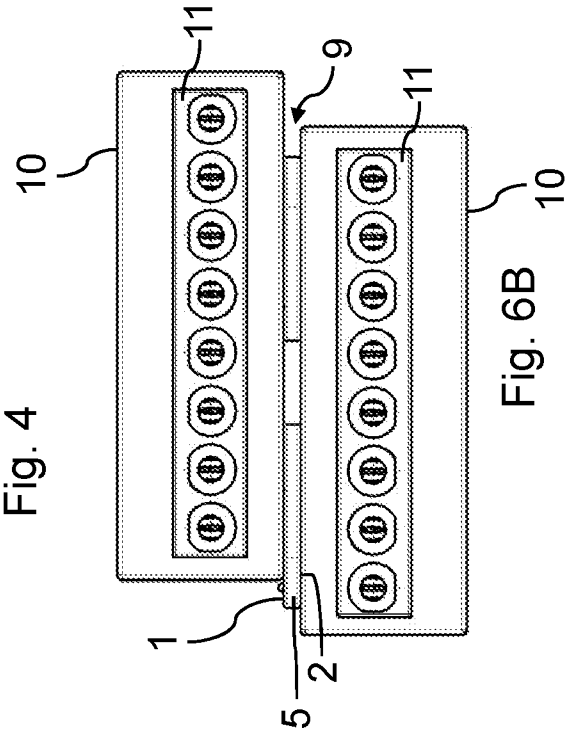

FIGS. 6A and 6B show how, by use of the carrier plate 9 according to the invention, different types of double-row plug connections may be established when plug connectors 10 of the same type are used, the plug connections thus formed having different connector faces 11, and accordingly allowing different connector face encoding for an identical number of poles. This may be achieved by appropriately laterally offset or off-center fastening of the plug connectors 10 to the carrier plate 9.

Figure 7B:
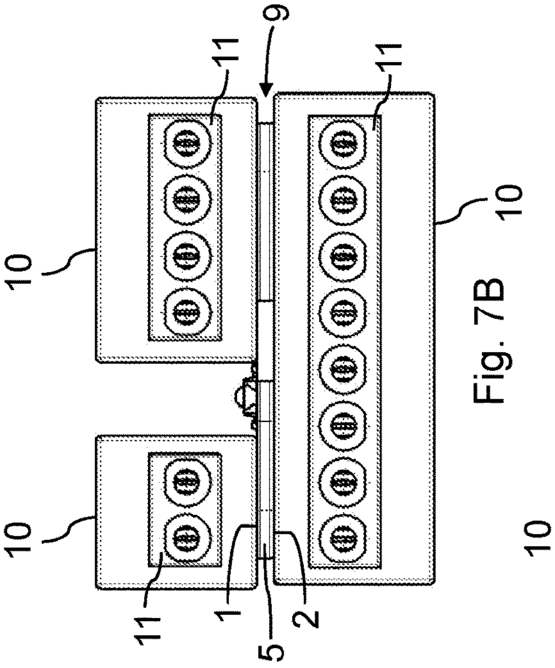
FIGS. 7A, 7B, and 8 show various arrangements of carrier plates and various types of plug connectors, in a front view.
Figure 7A:
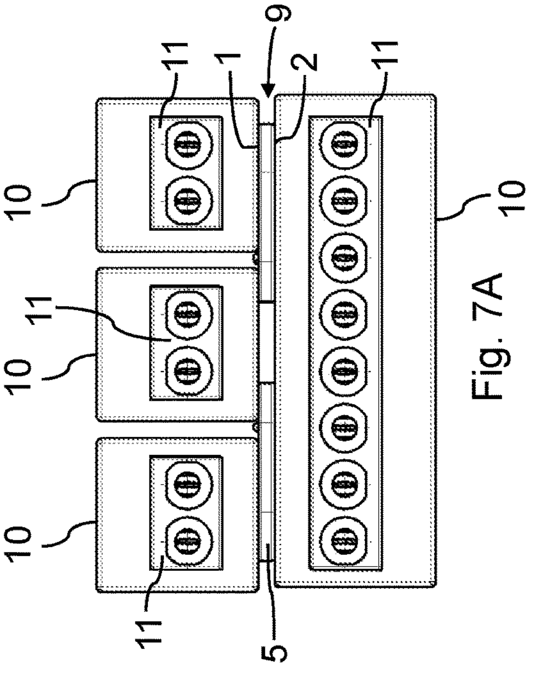

FIGS. 7A and 7B illustrate the configuration of a double-row plug connection having different connector faces 11, with an overall equal number of poles on both main surfaces 1, 2 or in both rows of the double-row plug connection. Three two-pole plug connectors 10 are situated at the first main surface 1 in the example illustrated in FIG. 7A, and one two-pole plug connector and one four-pole plug connector 10 are situated at the first main surface 1 in the example illustrated in FIG. 7B. In both cases an eight-pole plug connector 10 is situated at the second main surface 2.

Figure 8:
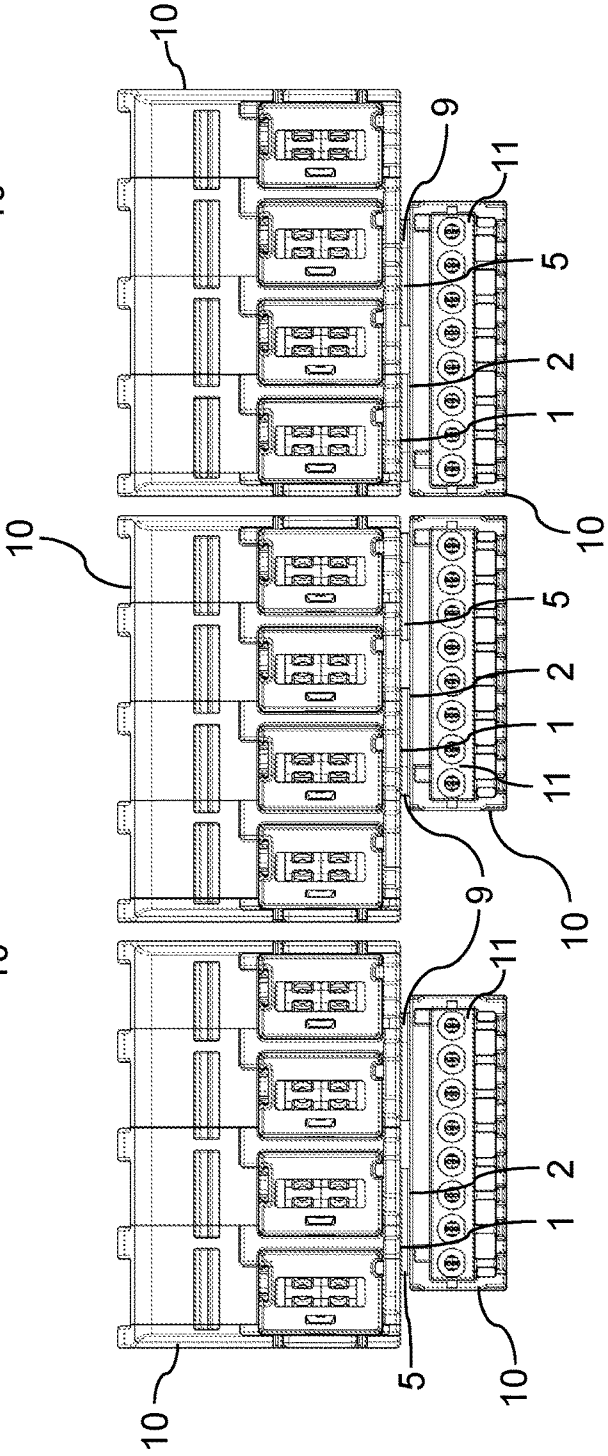

FIG. 8 illustrates that the carrier plate 9 may also be utilized to form hybrid plug connectors; i.e., plug connectors 10 of different types may be fastened to a main surface 1, 2 or to the opposite main surfaces 1, 2. In addition, the plug connectors 10 may be mounted differently at the carrier plate 9 with regard to their lateral positioning, i.e., with a different offset, which allows further encoding options.

FIGS. 9 through 12 illustrate that the carrier plate 9 may also be used in combination with shielding plates 16. Such shielding plates 16 may be situated, for example, only at one main surface 1, 2 of the carrier plate 9 or at both main surfaces 1, 2. The shielding plates 16 may be fixedly connected to the carrier plate 9 or, as separate components, situated between the carrier plate 9 and the plug connector 10 connected thereto.

Figure 11:
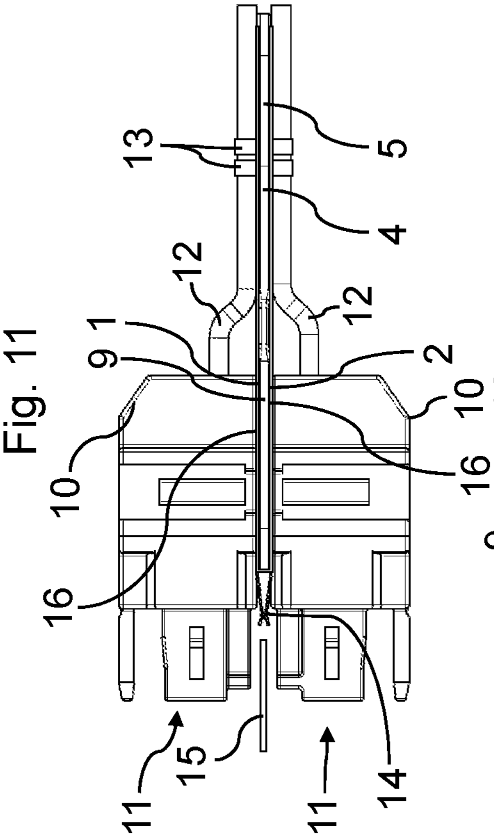
FIGS. 9 through 12 show various arrangements of carrier plates and plug connectors with a shielding plate, in front and side views.
Figure 12:
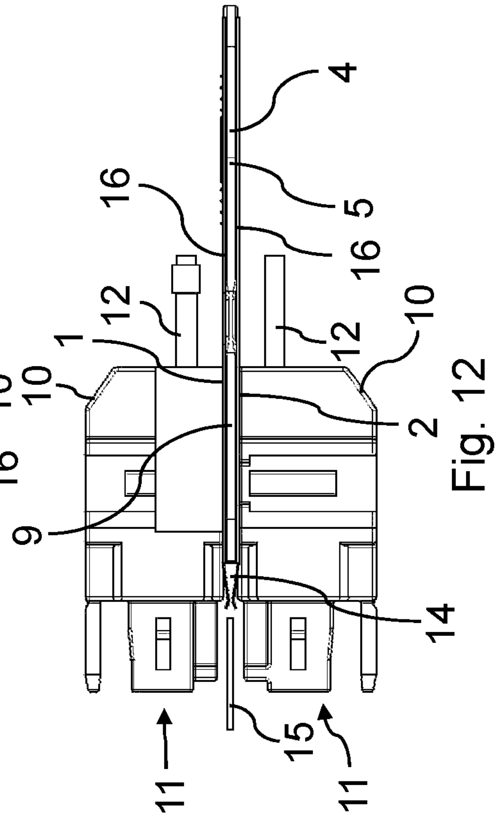
Figure 10:
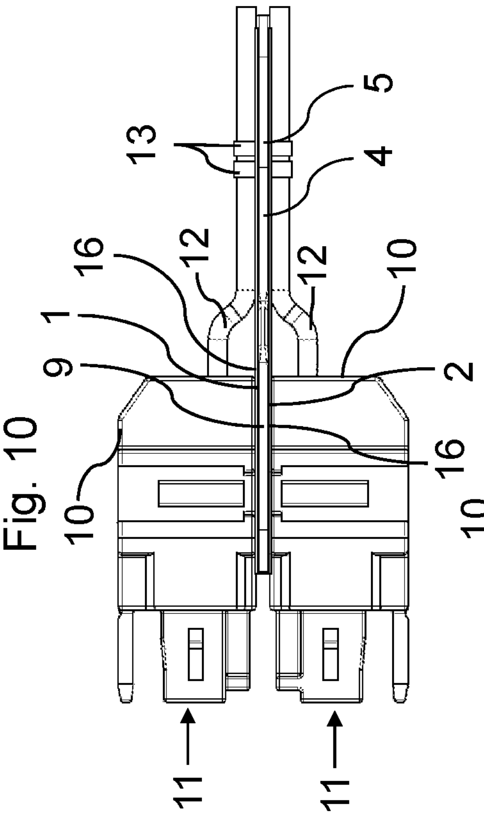
Figure 9:
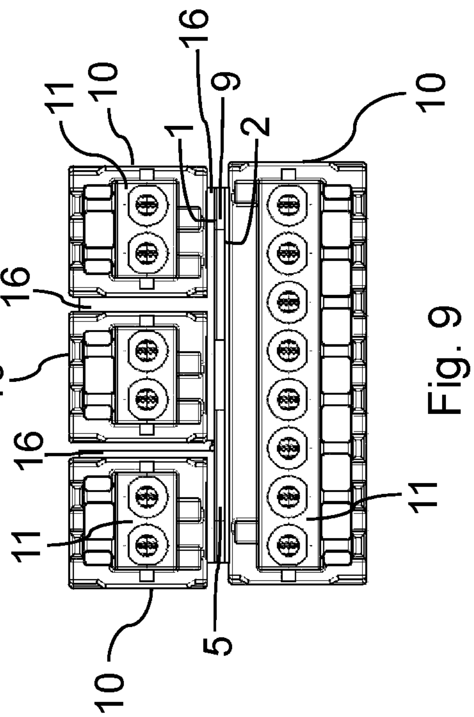
Figure 14:
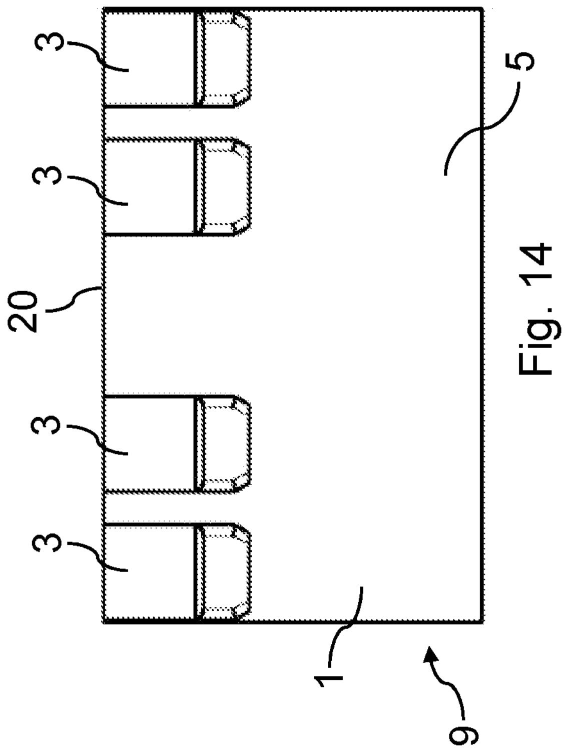
FIGS. 13 through 16 show a carrier plate according to an example in a perspective view, top view, sectional illustration, and side view.
Figure 16:
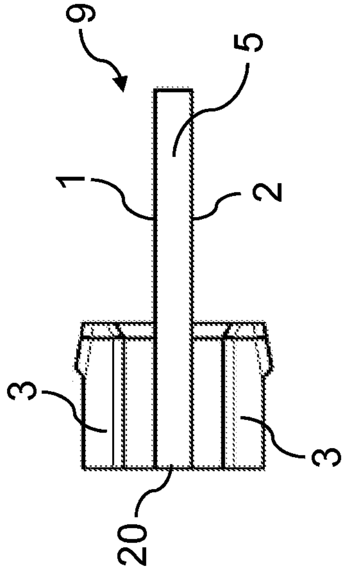
Figure 13:
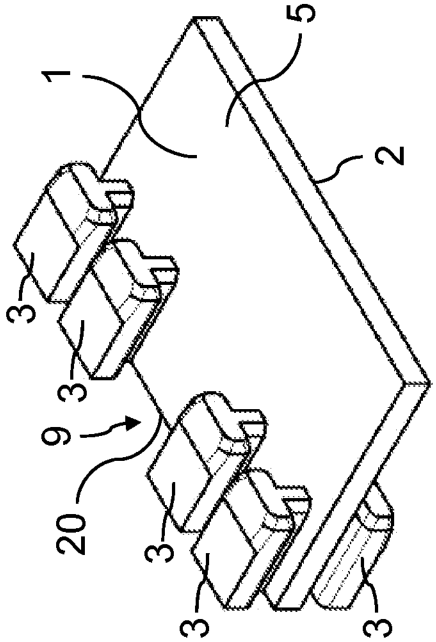
Figure 15:
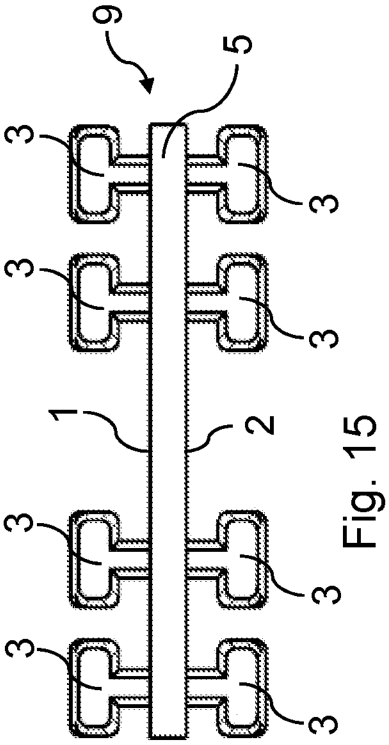

FIGS. 10 and 11 also show how electrical lines 12, which are connected to the plug connectors 10, may be fastened in the cable fixing region 4 by means of cable fixing components 13.

The shielding plates 16 may be formed into a shielding plug contact 14 at the side pointing toward the connector face 11, or may be connected to such a shielding plug contact 14. When the arrangement is plugged into the mating plug connector, this allows at the same time an electrical connection to an external shield connector 15, which, for example, in the manner of a blade contact or pin contact, may be inserted into a shielding plug contact 14 that is shaped in the manner of a fork contact.

FIGS. 13 through 16 show a carrier plate 9 according to an example, in which the first detent elements 3 on both main surfaces 1, 2 protrude from the main surfaces 1, 2, adjoining a border edge 20 of the carrier plate 9. In the example shown, the first detent elements 3 have a T-shaped cross section. For example, a mating plug connector 19 may be situated at the carrier plate 9, for example to allow a mating plug arrangement to be produced for an arrangement comprising a plug connector 10 and a carrier plate 9. Mutually compatible arrangements made up of plug connectors 10 and mating plug connectors 19 may thus be provided by use of carrier plates 9.

Figure 18:
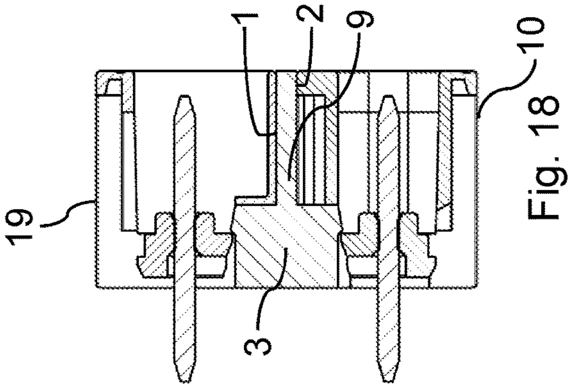
FIGS. 17 through 19 show an arrangement comprising a carrier plate and pin strips in a front view, a lateral sectional illustration, and an isometric view.
Figure 17:
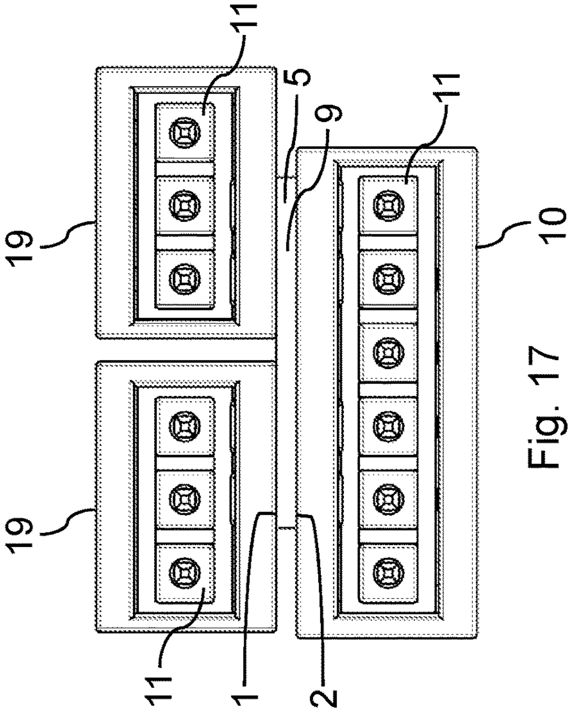
Figure 19:
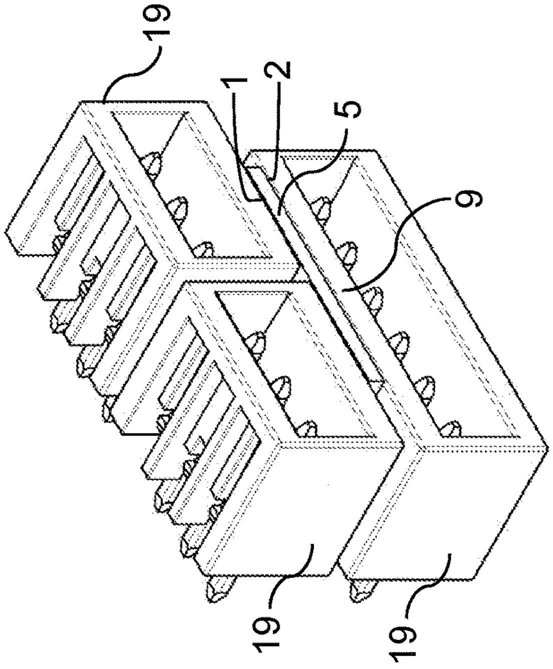

FIGS. 17 through 19 show a carrier plate 9, and include pin strips that may, for example, form mating plug connectors 19 for the plug connectors 10, designed as socket strips, shown in the further figures, the pin strips being situated on both main surfaces 1, 2 of the carrier plate 9 and being affixed thereto by means of the first detent elements 3.

Figure 21:
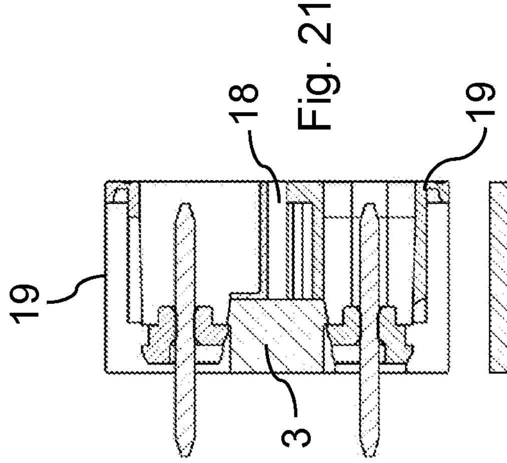
FIGS. 20 through 22 show an arrangement comprising mating plug connectors and a carrier plate that includes an encoding device, in front and side views, as well as an isolated illustration of the carrier plate in a sectional view.
Figure 22:
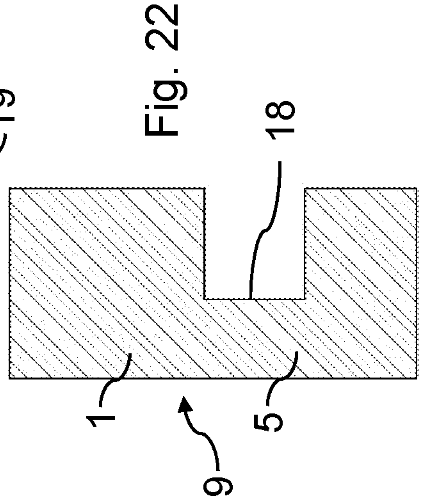
Figure 20:
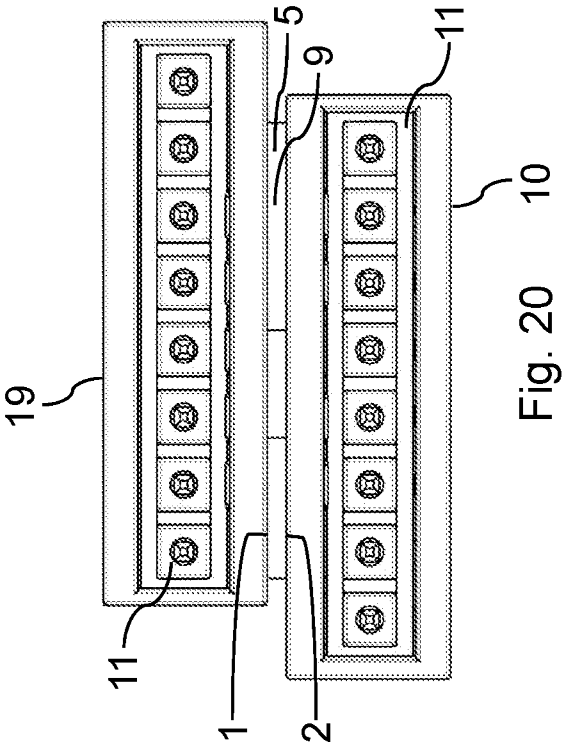
Figure 24:
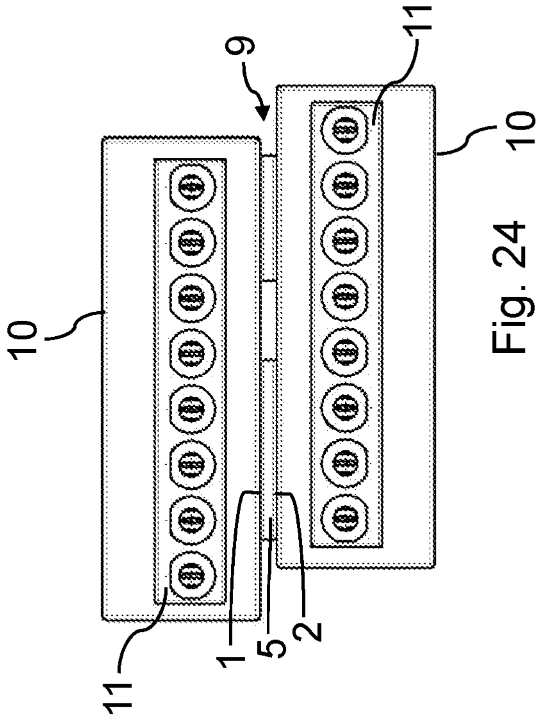
FIGS. 23 through 25 show an arrangement comprising plug connectors and a carrier plate that includes an encoding device in side and front views, as well as an isolated illustration of the carrier plate in a cutaway view.
Figure 23:
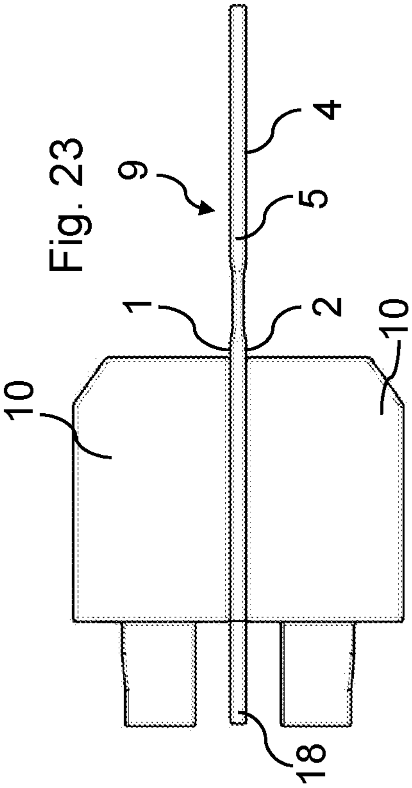
Figure 25:
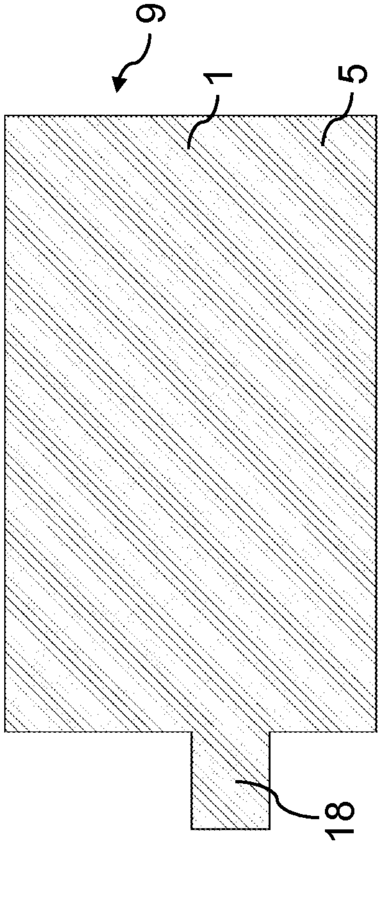

FIGS. 20 through 22 show an arrangement comprising a carrier plate 9 and mating plug connectors 19 affixed thereto, which are designed as pin strips having the same shape and number of poles. FIGS. 23 through 25 show a corresponding arrangement comprising a carrier plate 9 and plug connectors 10 affixed thereto, which are designed as socket strips having the same shape and number of poles. For these arrangements, bringing the plug connectors 10 and the mating plug connectors 19 together is initially hindered due to the same shape and number of poles on both sides of the carrier plate 9, since they may be plugged into one another in two different orientations. Therefore, the arrangement according to FIGS. 20 through 22 has a carrier plate 9 with an encoding device 18 designed as a material recess. The arrangement according to FIGS. 23 through 25 has a carrier plate 9 with an encoding device 18 designed as a material projection. In this way, an unambiguous insertion location and orientation of the plug connectors 10 and of the mating plug connectors 19 are specified by means of the encoding device 18. In the assembled state, the encoding device 18 designed as a material projection engages in the encoding device 18 designed as a material recess. FIG. 21 shows a sectional side view of the arrangement comprising a carrier plate 9 and the mating plug connectors 19 affixed thereto. FIG. 23 shows a side view of the arrangement comprising a carrier plate 9 and the plug connectors 10 affixed thereto.

Protection against mismating between the plug connectors 10, for example the female multipoint connectors and the mating plug connectors 19, for example the pin strips, is achieved by the encoding by means of the encoding elements 18 which are situated at the two carrier plates 9 and assigned to one another as mating parts. The female multipoint connectors and pin strips are thus prevented from being plugged in in the reverse orientation.

Figure 26:
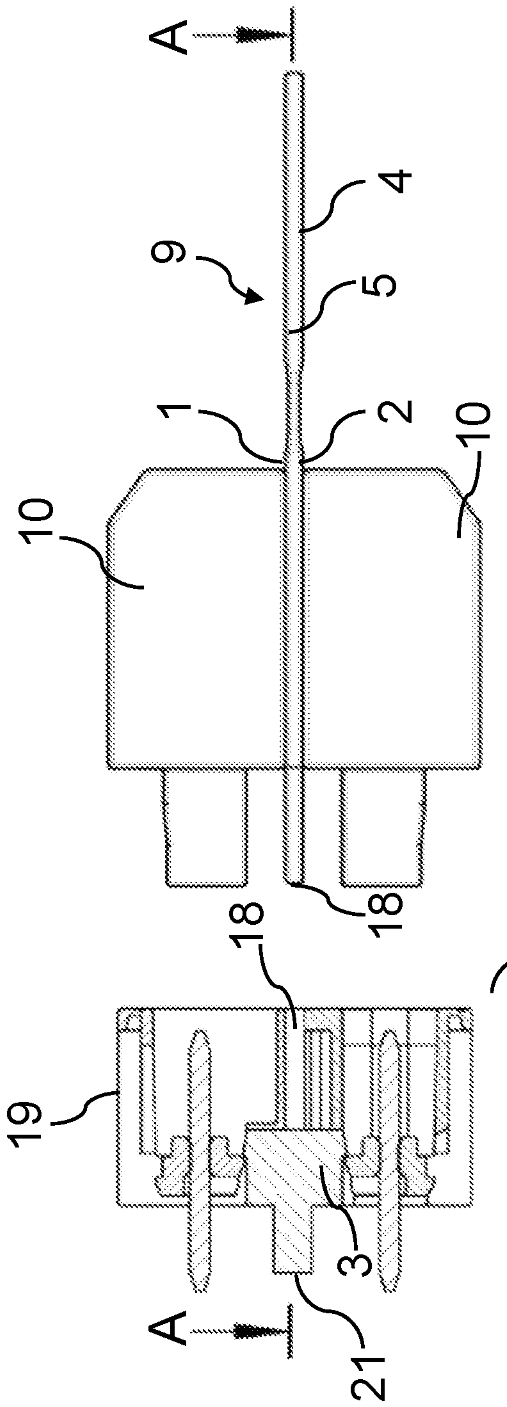
FIG. 26 shows an arrangement comprising mating plug connectors and a carrier plate that includes an encoding device, as well as an arrangement comprising plug connectors and a carrier plate that includes an encoding device, in a side view.

In the arrangement shown in FIG. 26, the module illustrated on the right, made up of two plug connectors 10 and a carrier plate 9, corresponds to the arrangement according to FIG. 23, for example. The carrier plate 9 of the arrangement including the plug connectors 10 has an encoding device 18, as mentioned above. The arrangement illustrated on the left has two mating plug connectors 19 with a carrier plate 3 that includes an encoding device 18 designed as a mating part, i.e., an encoding device 18 designed as a material recess. In this respect, this corresponds to the illustration in FIG. 21.

Figure 27:
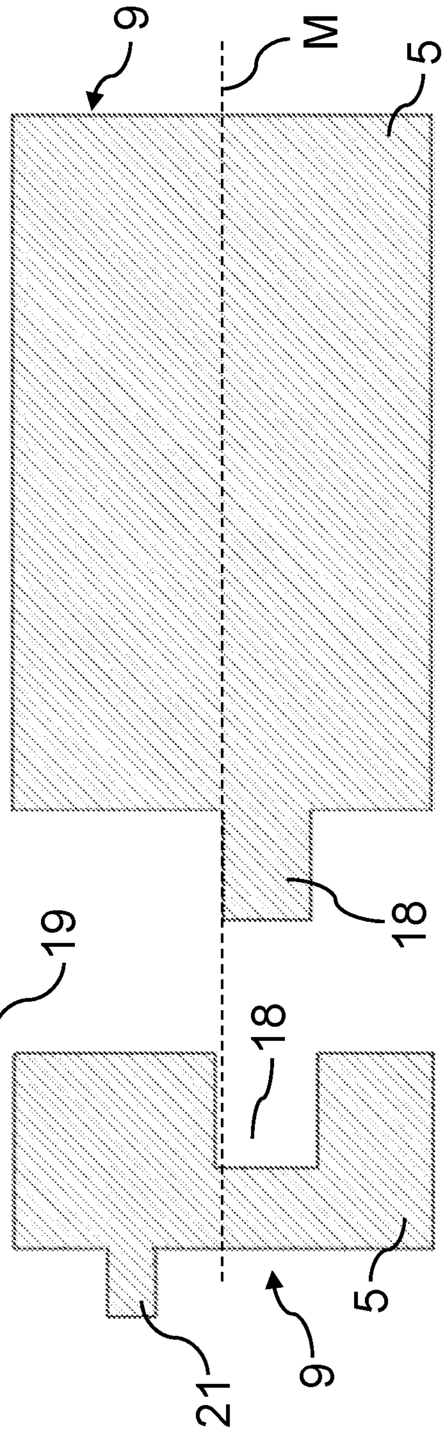
FIG. 27 shows the carrier plates of the arrangement according to FIG. 26 in the section plane A-A depicted in FIG. 26.

In addition, FIG. 26 as well as the sectional illustration in FIG. 27 show that the carrier plate 9 to which the mating plug connectors 19 are fastened may include a further encoding device 21, for example as a material projection, as illustrated, or also as a material recess. The further encoding device 21 may be situated at the carrier plate 9 in particular on the side facing away from the encoding device 18. The further encoding device 21 provides protection against mismating of the arrangement including the mating plug connectors 19 and comprising a printed circuit board to which the mating plug connectors 19 are to be soldered, for example. The further encoding device 21 prevents the mating plug connectors 19, for example, as pin strips, from being plugged onto the printed circuit board in the reverse orientation. For this purpose, the printed circuit board is advantageously designed in such a way that it has encoding designed as a mating part for the further encoding device 21, i.e., as a material projection or as a material recess. The encoding device 18 and/or the further encoding device 21 may advantageously be situated off-center with respect to a center axis M of the carrier plate 9, which extends centrally through the particular carrier plate 9, in parallel to the insertion direction of the plug connector 10 or of the mating plug connector 19.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A carrier plate in the form of a flat plate, the carrier plate comprising:
- a first main surface;
- a second main surface facing away from the first main surface, the first and second main surfaces being surface sides of the plate having a largest surface area; and
- first detent elements to which at least one electrical plug connector having second detent elements is affixable via a form-fit interlocking of the first detent elements with the second detent elements,
- wherein the carrier plate has the first detent elements at the first main surface and the second main surface so that the at least one electrical plug connector with the second detent elements is affixable to the first main surface and at least one further electrical plug connector with the second detent elements is affixable to the second main surface via a form-fit interlocking of the first detent elements with the second detent elements.

2. The carrier plate according to claim 1, wherein, at the first main surface and/or the second main surface, one, multiple, or all of the first detent elements are designed as a detent element that protrudes with respect to the first main surface and/or the second main surface.

3. The carrier plate according to claim 1, wherein the first detent elements are situated at the first main surface and/or the second main surface adjoining a border edge of the carrier plate.

4. An arrangement comprising:
- two of the carrier plate according to claim 1, such that a first carrier plate and a second carrier plate are provided;
- at least one plug connector affixed to the first carrier plate; and
- at least one mating plug connector affixed to the second carrier plate, the at least one mating plug connector being configured for connection to the at least one plug connector,
- wherein the at least one plug connector and/or the at least one mating plug connector have the second detent elements, and are affixable to the respective first or second carrier plate via a form-fit interlocking of the first detent elements with the second detent elements, and
- wherein at least one of the first or second carrier plates have an encoding device via which an insertion location and/or an insertion orientation of the at least one plug connector and of the at least one mating plug connector relative to one another is specified.

5. The carrier plate according to claim 1, wherein the carrier plate has at least one cable fixing region to which electrical lines, connected to the at least one electrical plug connector that is affixed to the carrier plate, are fixable.

6. The carrier plate according to claim 5, wherein the first detent elements are arranged at the first main surface and/or the second main surface, outside the at least one cable fixing region.

7. The carrier plate according to claim 1, wherein multiple electrical plug connectors are affixable next to one another at the first main surface and/or the second main surface via a form-fit interlocking of the first detent elements with the second detent elements.

8. The carrier plate according to claim 7, wherein the electrical plug connectors are selectively affixable to the first main surface and/or the second main surface at different positions relative to the carrier plate or at different positions substantially perpendicular to the insertion direction of the electrical plug connectors.

9. The carrier plate according to claim 7, wherein a number and type of the electrical plug connectors that are affixable to the first main surface and/or the second main surface is adapted to be varied.

10. An arrangement comprising:
- the carrier plate according to claim 1; and
- at least two of the electrical plug connectors, each of which have the second detent elements,
- wherein at least one of the electrical plug connectors is affixed to the first main surface and a further electrical plug connector is affixed to the second main surface via a form-fit interlocking of the first detent elements with the second detent elements.

11. The arrangement according to claim 10, wherein connector faces of the electrical plug connectors affixed to the first and the second main surface are oriented in a same direction.

12. The arrangement according to claim 10, wherein the at least one electrical plug connector affixed to the first main surface is offset relative to the further electrical plug connector affixed to the second main surface and/or has a different number of plug contacts.

13. The arrangement according to claim 10, wherein a different number of electrical plug connectors is affixed to the first main surface than to the second main surface.

14. The arrangement according to claim 10, wherein an additional component, which is not an electrical plug connector and which has at least one second detent element, is affixed to the first main surface and/or the second main surface via a form-fit interlocking of at least one of the first detent elements with the at least one second detent element of the additional component.

15. The arrangement according to claim 10, wherein a cable fixing region of the carrier plate protrudes with respect to the electrical plug connectors affixed thereto, so that electrical lines that are connected to the electrical plug connectors affixed to the carrier plate are fixable to the at least one cable fixing region.

16. The carrier plate according to claim 5, wherein the carrier plate has at least one encoding device, and wherein the first detent elements and the at least one encoding device are provided at a first end of the carrier plate and the at least one cable fixing region is provided at an opposing second end of the carrier plate.

17. The carrier plate according to claim 16, wherein the at least one encoding device is a recess or a projection that mates with a corresponding projection or recess of the at least one electrical plug connector or a mating plug connector.

* * * * *